(12) United States Patent
Wahl et al.

(10) Patent No.: US 10,158,207 B2
(45) Date of Patent: Dec. 18, 2018

(54) RECOVERY OF ENERGY FROM A LASER MACHINING SYSTEM

(75) Inventors: Eberhard Wahl, Weilheim (DE); Karel Vincke, Oedelem (BE); Matthias Himmelsbach, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 1222 days.

(21) Appl. No.: 12/880,390

(22) Filed: Sep. 13, 2010

(65) Prior Publication Data

US 2011/0024401 A1 Feb. 3, 2011

Related U.S. Application Data

(63) Continuation of application No. PCT/EP2009/001680, filed on Mar. 9, 2009.

(30) Foreign Application Priority Data

Mar. 12, 2008 (DE) .................. 10 2008 013 816

(51) Int. Cl.
| | |
|---|---|
| B23K 26/42 | (2006.01) |
| H01S 3/041 | (2006.01) |
| B23K 26/14 | (2014.01) |
| B23K 26/38 | (2014.01) |
| H01S 3/036 | (2006.01) |
| H01S 3/04 | (2006.01) |
| H01S 3/223 | (2006.01) |

(52) U.S. Cl.
CPC .............. *H01S 3/041* (2013.01); *B23K 26/14* (2013.01); *B23K 26/38* (2013.01); *H01S 3/036* (2013.01); *H01S 3/0407* (2013.01); *H01S 3/2232* (2013.01); *Y02P 70/181* (2015.11)

(58) Field of Classification Search
USPC ................ 219/121.6, 121.85; 372/34–36
IPC ....... B23K 26/032,26/03, 26/422, 26/42; F02G 1/04; F01K 27/02; H01S 3/042; F25B 30/00, 27/02
See application file for complete search history.

(56) References Cited

U.S. PATENT DOCUMENTS

| 3,634,778 A * | 1/1972 | Melikian et al. ................ 372/34 |
| 3,648,194 A * | 3/1972 | Melikian et al. ................ 372/34 |
| 3,668,549 A * | 6/1972 | Biancardi et al. .............. 372/34 |
| 3,719,454 A * | 3/1973 | Shang ........................... 422/127 |

(Continued)

FOREIGN PATENT DOCUMENTS

DE 69301879 T2 8/1996

OTHER PUBLICATIONS

Office Action from corresponding Chinese Application No. 200980115370.7, dated Feb. 28, 2012, with English translation, 13 pages.

(Continued)

*Primary Examiner* — Ibrahime A Abraham
*Assistant Examiner* — Frederick Calvetti
(74) *Attorney, Agent, or Firm* — Fish & Richardson P.C.

(57) ABSTRACT

A method for the recovery of energy from a laser machining system and a device for performing the same, in which the method includes operating the laser machining system and generating thermal energy having a maximum temperature $T_{max}$, removing at least a portion of the thermal energy, and recirculating the at least a portion of the thermal energy to the laser machining system.

26 Claims, 4 Drawing Sheets

(56) References Cited

U.S. PATENT DOCUMENTS

| | | | | |
|---|---|---|---|---|
| 4,150,341 | A * | 4/1979 | Ferguson | 372/35 |
| 4,163,199 | A * | 7/1979 | Treanor | 372/35 |
| 4,395,849 | A * | 8/1983 | Kasai et al. | 451/2 |
| 4,480,168 | A * | 10/1984 | Cielo et al. | 219/121.6 |
| 4,547,885 | A * | 10/1985 | Allen et al. | 372/58 |
| 4,740,981 | A * | 4/1988 | Kleisle et al. | 372/59 |
| 4,817,111 | A * | 3/1989 | Nilsen et al. | 372/58 |
| 5,303,253 | A * | 4/1994 | Henning et al. | 372/58 |
| 5,317,585 | A | 5/1994 | Gregor | |
| 5,425,044 | A * | 6/1995 | Schlie et al. | 372/55 |
| 5,495,490 | A * | 2/1996 | Rice et al. | 372/34 |
| 5,934,082 | A * | 8/1999 | Steinmeyer | 62/51.1 |
| 6,091,749 | A * | 7/2000 | Hoffmaster et al. | 372/38.02 |
| 6,128,917 | A * | 10/2000 | Riesch et al. | 62/476 |
| 6,155,073 | A * | 12/2000 | Gray | 62/480 |
| 6,266,352 | B1 * | 7/2001 | Eguchi et al. | 372/35 |
| 6,276,159 | B1 * | 8/2001 | Pfister et al. | 62/331 |
| 6,307,871 | B1 * | 10/2001 | Heberle | 372/34 |
| 6,650,681 | B1 * | 11/2003 | Ullman et al. | 372/89 |
| 6,658,861 | B1 * | 12/2003 | Ghoshal et al. | 62/3.7 |
| 7,349,213 | B2 * | 3/2008 | Campbell et al. | 361/699 |
| 7,584,628 | B2 * | 9/2009 | Harpole | 62/434 |
| 7,946,120 | B2 * | 5/2011 | Bell et al. | 62/3.7 |
| 8,109,325 | B2 * | 2/2012 | Kroliczek et al. | 165/104.21 |
| 2003/0021312 | A1 * | 1/2003 | Gruzdev et al. | 372/39 |
| 2005/0030988 | A1 * | 2/2005 | Nolan | 372/35 |
| 2005/0160752 | A1 * | 7/2005 | Ghoshal et al. | 62/259.2 |
| 2005/0195867 | A1 * | 9/2005 | Egawa et al. | 372/33 |
| 2006/0118532 | A1 * | 6/2006 | Chung et al. | 219/121.85 |
| 2007/0268944 | A1 * | 11/2007 | Voss | 372/34 |

OTHER PUBLICATIONS

Aleksandrov et al., "Industrial lasers with a technical efficiency higher than the physical efficiency", Soviet Technical Physics Letters, American Institute of Physics, US, vol. 6, No. 4, Apr. 1, 1980, pp. 193-194.

Hill et al., "The quantum Otto mobile and its application to directed energy", Proceedings of the SPIE, The International Society for Optical Engineering, vol. 5448, Apr. 25, 2004, pp. 84-94.

International Search Report for corresponding PCT Application No. PCT/EP2009/001680, dated Jul. 2, 2009, 2 pages.

* cited by examiner

RECOVERY OF ENERGY FROM A LASER MACHINING SYSTEM

CROSS REFERENCE TO RELATED APPLICATIONS

This application is a continuation of and claims priority under 35 U.S.C. § 120 to PCT Application No. PCT/EP2009/001680, filed on Mar. 9, 2009, which claims priority to German Application No. DE 10 2008 013 816.9, filed on Mar. 12, 2008. The contents of both of these priority applications are hereby incorporated by reference in their entirety.

TECHNICAL FIELD

The present disclosure is directed toward methods and devices for the recovery of energy from a laser machining system.

BACKGROUND

Consideration of the energy balance of laser machining systems (gas lasers, especially $CO_2$ lasers, or solid-state lasers, especially neodymium:yttrium-aluminium-garnet lasers, or also diode lasers) establishes that the flow of the energy fluxes can be improved. In some cases, the energy yield flowing into the laser beam, out of an energy input of 100%, is approximately 7%, e.g., in the case of $CO_2$ lasers, whereas the remaining approximately 93% remains as unused energy.

German patent document DE 69301879 T2 discloses a laser system, in particular a reflecting laser resonator, that provides for the suppression of amplified stimulated emission and heat removal, where there is no utilization of the removed heat. In some cases, the increased thermal energy caused by a laser machining system and the heat generated as a result, is used for space heating.

SUMMARY

In general, the subject matter described in this specification is directed towards methods and devices that enable the energy balance of a laser machining system to be improved.

According to at least one aspect, for example, the subject matter described in this specification relates to a method for the recovery of energy from a laser machining system where the method includes: operating the laser machining system and generating thermal energy having a maximum temperature $T_{max}$; removing thermal energy; recirculating the removed thermal energy to the laser machining system.

In particular, the method for the recovery of energy from a laser machining system having at least one energy recovery system, where the at least one energy recovery system has a characteristic threshold temperature $T_z$, includes: operating the laser machining system and generating thermal energy having a maximum temperature $T_{max}$, where the maximum temperature $T_{max}$ is higher than the threshold temperature $T_z$; removing thermal energy above the threshold temperature $T_z$; supplying the removed thermal energy into the at least one energy recovery system for the purpose of generating recovered energy; recirculating the recovered energy to the laser machining system. According to a first aspect, there is thereby provided a method for the recovery of energy from a laser machining system, where the laser machining system is operated, thermal energy is removed, the thermal energy is supplied at least to one energy recovery system for the purpose of recovering the thermal energy, and the recovered energy is recirculated into the laser machining system.

Recovery of energy is understood to be the utilization of residuary (or, also, unused) energy that does not serve the actual purpose of a device, in particular a laser machining machine. The residuary energy is principally thermal energy. Other forms of residuary energy in the laser machining system are, for example, mechanical energy or electrical energy or magnetic energy. The thermal energy occurs in the resonator, for example, in the laser medium.

An energy recovery system can be of a thermodynamic design, for example as a heat engine, or physicochemical, thermoelectric, biological or chemical design. Each energy recovery system has a threshold temperature $T_z$, from which the respective energy recovery system can be used. Currently available systems for the recovery of energy from heat (sorption refrigeration machines or heat machines, e.g. Stirling engines) are mostly able to utilize only the proportion above approximately 70° C., i.e. the threshold temperature $T_z$ for these energy recovery systems is approximately 70° C. Thermoelectric elements are able to utilize the temperatures just above the ambient temperature (designated $T_u$ in the following). The threshold temperature $T_z$ is thereby also selected through the choice of energy recovery system. Steam engines, steam turbines, gas turbines, Schukey engines or, also, Stirling engines or compact steam turbines, or a combination of these devices, can be used as heat engines. Physicochemical technologies comprise sorption refrigeration machines, in particular absorption refrigeration machines or adsorption refrigeration machines or absorption heat transformers (waste heat transformers). Thermoelectrically, a thermoelectric generator can be used.

In a working environment, in particular in the case of a laser machining system, various temperature ranges occur, for example, in the cooling medium: between the threshold temperature $T_z$ and a maximum temperature $T_{max}$ there is a high-temperature heat which is available for the energy recovery system. Extending between the threshold temperature $T_z$ and the ambient temperature $T_u$ there is a temperature range that can normally be drawn away, as waste heat, directly to the environment (without expenditure of further significant energy). Extending between the temperature $T_u$ and $T_{min}$ there is a temperature range that can possibly be drawn away to the environment only with further application of energy (e.g., by means of a compression refrigeration machine). In order to achieve in the cooling medium a temperature range from below the ambient temperature $T_u$ to a required minimum temperature $T_{min}$, a refrigeration machine, for example, is used, the operation of which requires additional energy. This energy can be obtained from the recovered energy of the energy recovery system and thereby fed back, as required energy, to the laser machining system. In the case of a sorption refrigeration machine, it would also be possible for the necessary refrigerating capacity to be made available directly (without an additional refrigeration machine) via the energy recovery system.

Laser machining systems are understood to be high-power industrial laser installations, in particular those having an output power of 1-8 kW. Operating of the laser machining system is constituted, on the one hand, by the operation of the laser, i.e., the generation of a laser beam. However, operation of a laser machining system and generation of thermal energy are also being effected even when it is working in standby mode, for example when idling. A considerable amount of waste heat can be produced in this case, for example if a radial turboblower is used.

In the generation of thermal energy, a maximum temperature $T_{max}$ is generated, for example in the cooling medium. Unused, or residuary, thermal energy occurs at components that heat up: these are, for example, the resonator, the active medium, the HF generator, the dust arrester, compressors, cooling media, the traversing motors, the workpiece during the machining process, further units of the laser machining system, further machines of the laser machining system.

Removal of thermal energy above the threshold temperature $T_z$ is understood to be a process of heat transfer over a defined time span. In this case, heat is transferred from a component of the laser machining system into, for example, a transport medium, or cooling medium, such as a fluid, in particular cooling water, organic media, or a gas. The thermal energy is drawn away, through the transport/cooling medium, from components of the laser machining system that heat up.

The removal of the thermal energy in this case occurs above the threshold temperature $T_z$. This allows tapping of a temperature band that can be utilized by the energy recovery system.

In the case of a $CO_2$ laser, more than 90% of the applied energy can be lost as waste heat. Of the more than 90% of energy lost as waste heat, the resonator accounts for 40-60%, and the HF generator and machine (dust arrester, drives, etc.) account for the remainder. In the case of systems having solid-state lasers (rod lasers, diode-laser-pumped disk lasers, fiber lasers), approximately more than 75% of applied energy is lost as waste heat.

The removal, or drawing away, of thermal energy from the laser gas can be effected by means of any heat conducting system, including, for example, cooling systems or by means of heat exchangers. The effective removal of the heat is necessary for the functioning of the laser process.

The supplying of the removed thermal energy into at least one energy recovery system is understood to be the transfer of heat from the transport medium to the energy recovery system. This is effected for the purpose of generating recovered energy from the removed thermal energy tapped at or above the threshold temperature $T_z$.

The removal, transport and supply of thermal energy cause heat to be transferred from the active medium to an energy recovery system. The thermal energy has been supplied to an energy recovery system when the majority of the energy tapped in a defined time span has been transferred to the energy recovery system.

The possible energy recovery systems also can convert thermal energy into other forms of energy. An energy conversion system, for example, is provided for this purpose, and a plurality of energy recovery systems are provided, which are connected in series and/or in parallel. For heat tapping, it is possible to use heat exchangers operating on the counterflow principle, for example, and for the latter to be applied, at the resonator, to the gas-carrying tubes. These heat exchangers can then be operated in parallel next to one another and/or in series, such that the cooling medium is cooled down, for each heat exchanger unit, by a predefined temperature difference $\Delta T$, and consequently this temperature band, i.e., this thermal energy, has been extracted from the laser machining system, for example at the resonator, and has thereby been supplied to the energy recovery system. This can be effected using the counterflow principle.

Thus, it is also possible for energy to be converted from a first form of energy (I) to a second form of energy (II), optionally via a further, intermediate form of energy (III). The end product is then a form of energy that can be recirculated into the laser machining system, but also can be a product produced through a form of energy. Converted forms of energy include, for example, electrical energy and/or mechanical energy and/or pressure and/or magnetic energy.

The recovered energy, or form of energy, produced from the energy recovery system and/or the products of this converted form of energy are recirculated to the laser machining system. Recirculated energy is understood to be a certain percentage of the unused, residuary energy that directly benefits the laser machining system. Forms of recirculated energy are, for example: electrical energy, magnetic energy, thermal energy, mechanical energy.

For example, electrical energy is fed back into the electric circuit of the laser machining system. This electrical energy is used, for example, to operate HF generators and blower/circulation pumps, the traversing motors (if appropriate, stepping motors) that move, for example, the machining table of the laser machining system, to move the conveyor belt of the laser machining system, to alter the distances between optical elements (lenses, phase shifters, etc.), to move the laser head over a working plane, etc. Furthermore, the electrical energy can be used to operate the lighting of the laser machining system. Furthermore, the electrical energy can be used to operate the cooling unit, for example its compressors or feed pumps. Furthermore, a sorption refrigeration machine can also be operated. A sorption refrigeration machine can be operated directly by means of the waste heat of the laser system, without need for indirect operation via a recovered form of energy. It is thereby possible for the cooling medium to be cooled to the minimally required temperature $T_{min}$ below the ambient temperature without the necessity of using "new" energy for this purpose.

Recirculated products can include substances used by the laser machining system, for example gases or compressed air. These products are produced by the converted energy of the energy conversion system. Compressed air that is produced can be used, for example, to clean and/or operate the dust arrester of the laser machining system, as a cutting gas for laser cutting, or to operate an automation component. Gases produced can be supplied, in the form of cutting gases or laser gases, to the laser machining system.

In a further embodiment, a method is provided where more than one energy recovery system is provided. Thus, either the same energy recovery system can be used multiply in an arrangement, or differing energy recovery systems, having differing threshold temperatures $T_z$, can be used and, in this way, it is possible to tap differing thermal bandwidths that are present and to recover energy therefrom.

In a further embodiment, a method is provided wherein the thermal energy is removed in multiple intervals between the threshold temperature $T_z$ and the maximum temperature $T_{max}$. In this way, it is possible for a difference range from $T_{max}$ to $T_z$ to be thermally reduced in a plurality of stages and, in this way, for example, it is possible to use a plurality of energy recovery systems which share the range of the usable thermal energy $(T_{max}-T_z)$. Thus, this usable thermal energy $(T_{max}-T_z)$ can be tapped in bands of $(T_{max}-T_z)/N$, where N denotes the number of heat exchangers or energy recovery systems that are available.

In a further embodiment, a method is provided where the recovered energy is used to operate a refrigeration machine, or wherein the energy recovery system is a sorption refrigeration machine. The cooling medium can thereby be cooled down to the required minimum temperature without need for additional, external "new" energy.

In a further embodiment, a method is provided wherein the thermal energy below the threshold temperature $T_z$ and above the ambient temperature $T_u$ is drawn off by an air cooler. In this way, this temperature band that would not be utilizable by the energy recovery system itself can be taken off, and, in some implementations, reused itself as thermal energy, for example as heating.

In a further embodiment, a method is provided where the thermal energy below the ambient temperature $T_u$ and above the minimally required temperature $T_{min}$ is drawn off by a refrigeration machine. This cooling to the minimally required temperature $T_{min}$ by this refrigeration machine closes the final gap in the cooling of the cooling medium— ideally, the refrigeration machine itself, in turn, is operated by the recovered energy, whereby the energy balance of the laser machining system can be further improved.

In a further embodiment, a method is provided where the selected maximum temperature $T_{max}$ is up to 260° C., the selected threshold temperature $T_z$ is in the range from 60° C. to 120° C., the selected ambient temperature $T_u$ is in the range from 25° C. to 55° C., and the selected minimally required temperature $T_{min}$ is in the range from 20° C. to 35° C. The selection of these temperatures makes it possible to achieve a good, usable range for recovery from thermal energy in the high-temperature heat range.

In a further embodiment, the laser machining system includes a cooling system, a second removal of the thermal energy being effected at the heat output side of the cooling system. The cooling system can include a laser cooling system having a liquid or a gas as a cooling medium. Example liquids include water, water with additives, or organic substances, e.g. ethanol. Water vapor, for example, is conceivable as a gas.

The majority of the thermal energy of a laser machining system is concentrated at the resonator, particularly in the resonator in the laser gas. The thermal energy is drawn from the resonator, or from the laser gas, by a cooling system, i.e., the laser gas is cooled down. Cooling systems are systems that employ thermodynamic principles and draw heat from heated components and media, for example from the resonator, or its gas, through heat flow and mass flow. This is effected predominantly by means of cooling water, being effected, in the case of a $CO_2$ gas laser, in particular, through cooling coils that surround the gas guide, and, in the case of solid-state lasers, usually being effected through direct or almost direct cooling of the solid by means of cooling water.

The cooling system can surround the gas courses that contain the laser gas; in some implementations, cooling coils, or cooling fins, of the cooling system are in direct contact with the laser gas flowing past these fins. The cooling coils, or the cooling fins, can be located in the resonator, including, for example, in the intake and outflow ducts.

The second removal of thermal energy at the heat output side of the cooling system can be made equal to the supply of thermal energy to the energy recovery system. The second removal can also be coincident with the first removal, and is designated separately here merely to aid understanding.

The first removal is effected in that the cooling coils, or cooling fins, or the cooling medium flowing therein, is or are of a lower temperature than the laser gas. The thermal energy is extracted from the gas as a result of the given temperature difference, and is transferred into the cooling medium. As a result, the gas cools down and the cooling medium heats up.

The cooling system, or the cooling medium, transports the thermal energy, over a distance d, to at least one further heat exchanger, which can be integral with the energy recovery system. The transfer of thermal energy from the cooling medium to the energy recovery system, and the therewith associated change in the heat relationships, is designated as the second removal.

The heat output side of the cooling system is the output zone of the cooling system described above. In an embodiment, there is more than one heat output side, or output zone. In this case, the flow of the cooling medium in the cooling system is divided, for example, after the removal of energy, into cooling sections that run in parallel. In this configuration, multiple energy recovery systems can be supplied in parallel with thermal energy, at multiple heat output sides. In some implementations, the cooling system has only one cooling section, in which case a plurality of energy recovery systems can then be connected in series for example, heat engine—compressed-air generation or heat engine—electric power generation).

The cooling can be effected in three steps, in two steps, or in one step. The cooling medium ideally heats up to the maximum temperature of the laser medium and, in one step, transfers the thermal energy to an energy recovery system, by parts to a plurality of energy recovery systems connected in series or in parallel.

In a further embodiment, the energy recovery system comprises a sorption refrigeration machine and/or a thermoelectric generator and/or a steam engine and/or a steam turbine and/or a gas turbine and/or a Schukey engine and/or a Stirling engine and/or a compact steam turbine. In the case of steam processes, so-called "organic Rankine cycles" (ORC) are also suitable. In the case of ORC processes, the working medium is not water, but an organic medium. These processes are particularly suitable because they operate at particularly low temperatures (in the region of 100° C.).

A combination of energy recovery systems can be used in order to utilize the entire temperature range from $T_{max}$ of the high-temperature circuit to a low threshold temperature $T_z$. If differing energy recovery systems, having differing threshold temperatures $T_z$, are combined or combined in series, the differing energy recovery systems can make use of differing heat sources of greatly differing temperature ranges.

Energy recovery systems can be used which generate mechanical energy in the form of a rotary motion. This motion can be used at a generator, in order to generate electric power that is fed back to the laser machining system.

In a further embodiment, the energy recovery system provides energy for an air compressor. For example, by means of an air compressor unit, the ambient air, or an intake volume, is partially cleaned and compressed to a lesser volume by means of an operating pressure. Air compressors are, for example, piston compressors or screw compressors or turbo compressors or transonic compressors. The energy conversion systems provide a mechanical energy in the form of a rotary motion that can be used directly to compress the air through the systems.

In a further embodiment, a filtration stage is provided, by means of which the compressed air can be separated into constituents. In this filtration state, the air can be separated into the gases $N_2$, $O_2$, $CO_2$. In some implementations, only one of the said gases is extracted from the air.

In a further embodiment, the filtration stage is effected by means of a membrane filter system and/or a pressure-swing adsorption (PSA) system. In a further embodiment, at least one of the compressed air constituents is used as a laser gas and/or cutting gas.

The air constituents $N_2$, $O_2$, $CO_2$ obtained from the filtration are gases that are used in many laser machining systems, or laser applications. Thus, for example, $CO_2$ is used as a laser gas in the active medium in the case of the $CO_2$ laser, as is $N_2$. Since $N_2$ or $CO_2$ constituents are consumed in the active medium during laser emission, the recovery of the $CO_2$ tank or $N_2$ tank of a $CO_2$ laser machining system can be replenished in this way.

Furthermore, oxygen ($O_2$) or nitrogen ($N_2$) is required for laser cutting, i.e., flame cutting or fusion cutting. The process of recovering these air constituents makes it possible, in the case of flame cutting, to supply the oxygen obtained from the system or, in the case of fusion cutting, to supply the nitrogen obtained from the system.

In a further embodiment, at least one of the compressed air constituents is routed into at least one pressure storage device. The compressed air constituents can be routed into separate storage devices, separated from the volume. These storage devices are can include pressure storage devices and function, for example, as buffers. This means that the air constituents not used immediately as laser gas, or cutting gas, can be kept in a storage device and used when required.

In a further embodiment, the removal of the thermal energy is provided at least two predefined temperature levels. Since, in this embodiment, the energy recovery systems used make use of differing temperature levels and require differing ΔTs, it is advantageous, in respect of energy and technically, for the entire energy spectrum to be divided into more than one temperature level and for the thermal energy to be tapped at these differing temperature levels.

In another aspect, the subject matter of the present disclosure can be achieved with a device for the recovery of energy on a laser machining system having an energy source, where the device includes a removal device for at least one form of energy, and an energy conversion system, the device furthermore comprising a recirculation system.

The laser machining system can be a high-power industrial laser installation. The laser machining system includes, for example, a laser unit with its standard component parts such as, for example, resonator, electrodes, active medium, resonator mirror, etc.

The discharge path can be constituted by quartz glass tubes, in which there is a laser gas as an active medium such as, for example, nitrogen or ArF or KrF or XeCl or XeF or helium-neon or argon or krypton or carbon dioxide. Furthermore, the active medium is also a solid such as, for example, glass, $Al_2O_3$, YAG, as base materials, and chrome, neodymium, ytterbium, titanium, erbium, for example, as doping materials. Moreover, other laser forms are possible, such as, for example, diode lasers, dye lasers, color-center lasers, semiconductor lasers, free-electron lasers.

A removal device is a physical conductor, or a substance, that can transfer various types of energy or particles. The removal device can be a conductor for light, magnetism, electric current, or for heat. The removal device can be connected to the energy source. In some implementations, the removal device surrounds the energy source or the removal device is surrounded by the energy source.

The removal device routes energy from a removal point (interface between energy source and removal device) to a supply point (interface between removal device and energy conversion system). The path from the removal point to the supply point can be surrounded by an insulating material, including, for example, a dielectric or non-conductor, an optical insulator or a thermal insulator. These insulators (insulating for a multiplicity of forms of energy) provide for a supply-point:removal point efficiency of, for example, about 0.9, about 0.85, or about 0.8. The removal device can be an electrical conductor.

If the removal device is to be used for heat transfer, three modes of heat transfer are available, being thermal conduction, thermal radiation and thermal convection. If "thermal conduction" is selected as the transfer mode, metals can be used as a structural material for the removal device. If thermal convection is used as the transfer mode, fluids can be used for the removal device, such as, for example, chemically compounded fluids. The removal device in this case can be constituted by a fluid carrier and a fluid, the fluid flowing in the fluid carrier.

An energy recovery system is a system that converts fed-in energy (primary energy) into reconverted energy (secondary energy). A recirculation system is a system that extracts recovered or converted energy, or a product of this converted energy, from an energy recovery system, or from a storage device, and recirculates this energy or product into the laser machining system. Energy in this case is supplied, in particular, to a component that processes energy, or a product (produced by a machine connected to the energy conversion system) is recirculated to a laser machining system component or into the machining space of the laser machining system.

In a further preferred embodiment, a device is provided, the recirculation system comprising an electrical conductor and/or a pneumatic conductor and/or a hydraulic conductor and/or a heat conductor and/or a light conductor. The recirculation system can route energy from a removal point (such as an interface between energy recovery system and recirculation system, including, for example, an interface between storage device and recirculation system) to a supply point (such as an interface between recirculation system and laser machining system component utilizing energy, including, for example, an interface between recirculation system and energy source or an interface between recirculation system and machining surface of the laser machining system).

These conductors can be connected, at one end, to one or more pressure storage devices (i.e., its outputs) and, at the other end, are connected to a recirculation location of the laser machining system. A recirculation location is the location at which the energy, or the product, is to be used, for example the point at which, or area around which, the laser beam enters the material to be machined.

Furthermore, a gas laser installation can have gas tanks filled with $CO_2$ or He or $N_2$. In some implementations, the nitrogen tank and the carbon dioxide tank of the gas laser installation can be replenished from the pressure storage devices.

In a further embodiment, a device is provided where the device includes a storage device. The storage device serves to store energy for the purpose of subsequent use. The storage device capacity can be matched to the requirements of the laser machining system. The storage device can be, in particular, a mechanical storage device, an electrical storage device, a chemical storage device and/or a heat storage device. The mechanical storage device serves to store kinetic energy, for example by means of a flywheel, to store potential energy by means of a spring, pressure storage device, point storage power plant, compressed-air storage power plant, or weight. The electrical storage device stores electrical energy in, for example, a capacitor or accumulator, or stores magnetic energy in a magnetic energy storage device, such as a superconducting magnetic energy storage device. In a chemical storage device, electrical energy is stored, for example, in an accumulator or in a battery, and chemical energy is stored in a galvanic cell. In a heat storage device, thermal energy is stored.

The storage device can be the link between the energy conversion system (or a machine driven by the energy conversion system) and the recirculation system. Furthermore, the storage device can be a pressure storage device. Pressure storage devices can include pressure vessels whose interior pressure is above the ambient pressure. The pressure storage devices can be supplied with compressed air or the gases divided up by the membrane filter system. The gases divided up by the membrane filter system can be kept in separate pressure storage devices, separate from the volume. The pressure storage devices furthermore comprise outputs which are coupled to the recirculation system. These outputs are opened or closed by pressure valves. These pressure valves are monitored and controlled by a control unit.

In a further embodiment, a device is provided wherein the energy source includes a resonator and/or an active medium and/or a cooling medium and/or a laser component and/or a HF generator and/or a traversing motor and/or a workpiece during the machining process.

The resonator, or the active medium, emits large quantities of unused energy in the laser machining system. Irrespective of the laser machining system and its power, these quantities amount to approximately 40% of the total energy, in the form of electric power, that is input to the system. The HF generator emits approximately 20% of the input energy as unused heat energy. Tapping of thermal energy is therefore worthwhile here.

In a further embodiment, a device is provided wherein the removal device for energy is a cooling system. The cooling system, with its cooling coils or fins, serves to cool the laser gas. The cooling fins function as heat exchangers, are hollow, to enable a cooling medium to be conveyed, and are composed of highly thermally conductive material. The cooling coils are in direct contact with the laser gas. The laser gas is moving, and flows past the cooling coils. The velocity of gas flow is influenced by a radial turboblower. The radial turboblower circulates the laser gas continuously and causes the gas to flow around the water-cooled heat exchangers (cooling coils). The heat can also be tapped at the output side of the cooling system (thus, after it has been raised to a higher temperature) and supplied to an energy recovery system.

In a further embodiment, the device furthermore includes at least one take-off housing and/or at least one infeed housing. The gas, at the corners of a preferably square laser unit, flows via an infeed housing into the discharge tubes and is guided, in the center of each side, back to the radial turboblower via a take-off housing. The take-off housing opens into the intake region of the radial turboblower, the infeed housings being coupled to the outlet region of the radial turboblower.

In a further embodiment, the cooling fins are located in at least one take-off housing and/or at least one infeed housing. The purpose of the cooling system is to achieve, a gas temperature of approximately 260° C. before the gas flows through the cooling fins, and to achieve, a gas temperature of approximately 20° C. after the cooling process. A high temperature range of the gas intake temperature to the gas outlet temperature provides for a high cooling-medium temperature through the heat exchangers, or cooling fins in order to operate the previously described energy conversion systems. The cooling fins are installed either in the take-off housing or in the infeed housing, in order to achieve cooling of the laser gas that is not effected in successive steps. In order to achieve cooling in one step, the gas can also be cooled in aggregation. The laser gas, in this aggregated state, is optionally cooled before the cooling process, i.e., before flowing past the cooling fins, and is subsequently divided up again. This is achieved, for example, by merging the take-off housings into one line. Cooling fins are provided in this line, in order to cool the gas flow to the required infeed temperature in one step. The line is also to be regarded as a take-off housing. The gas is subsequently apportioned, through a distributor, to the infeed housing.

In a further embodiment, the device furthermore includes an air compressor. The air compressor can be flange-mounted onto a drive shaft of an energy conversion system. The mechanical energy, such as the rotational energy of the energy conversion system, is used in this case to operate an air compressor in the form of, for example, a piston compressor or screw compressor or turbo compressor or transonic compressor. The air compressor sucks in the ambient air and, by means of a defined operating pressure, compresses this ambient air to a lesser volume.

In a further embodiment, the device furthermore includes a membrane filter system. Membrane filter systems are filter systems that are able to break down gas mixtures into individual gas constituents. This filter process requires high pressures of the gas to be filtered, this being achieved, for example, through upstream connection of a compressor. The ambient air is separated into its constituents, i.e., $N_2$, $O_2$, $CO_2$, by means of the membrane filter system.

In a further embodiment, the device furthermore includes a control unit, or open-loop/closed-loop control unit. A control unit is, for example, a PC that controls the laser machining system. The control unit can measure, route and distribute the energy flows through the entire laser machining system.

DETAILED DESCRIPTION

Figure 1:
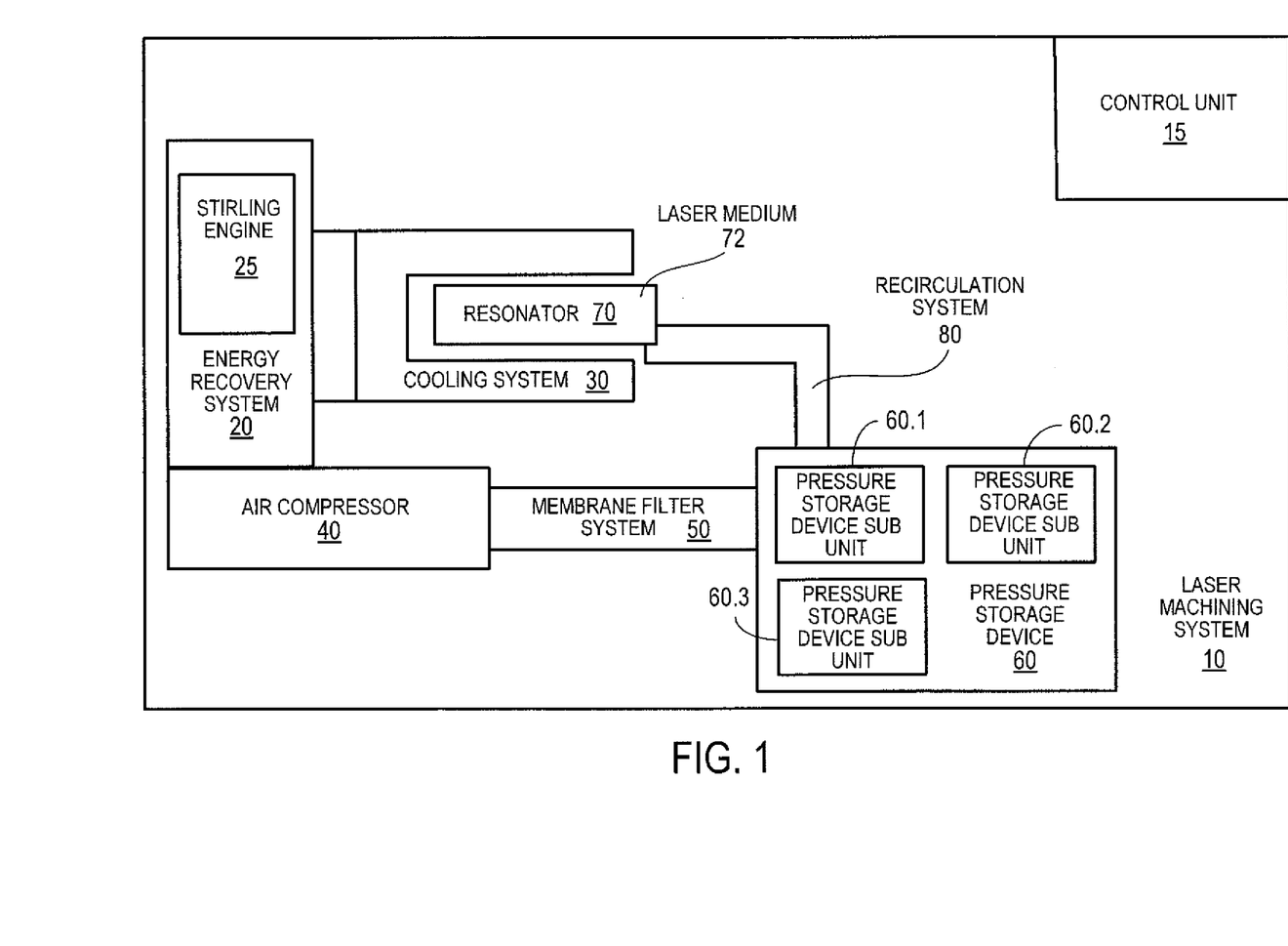
FIG. 1 is a schematic representation of an exemplary laser machining.

FIG. 1 is a schematic representation of an exemplary laser machining system 10. The laser machining system 10 has a resonator 70, which has a laser medium 72. The beam source is a $CO_2$ laser, the laser medium 72 being a gas mixture composed of helium, nitrogen and carbon dioxide. The gas mixture in the resonator is circulated continuously, for example by means of a radial turboblower (not shown). Connected to the resonator 70 there is a cooling system 30, which is connected, via a heat output side 31, to an energy recovery system 20. The cooling system 30 operates with water as a cooling medium. A compressor 40 is connected to the energy recovery system 20, and this compressor 40 is connected to a pressure storage device 60 via a membrane filter system 50. The energy recovery system 20 comprises a Stirling engine 25, whose output shaft operates the air compressor 40. The pressure storage device 60 comprises three sub-units, being the pressure storage devices 60.1, 60.2 and 60.3. The recirculation system 80 constitutes a link between the pressure storage device 60 and the resonator 70 and/or the machining point of the focused laser beam. The resonator 70 can be fed from the pressure vessel 60 by means of this recirculation system 80. Furthermore, a control unit 15 is provided, which can control or regulate all of these components.

The laser machining system 10, or its beam source, emits a laser beam in a continuous-wave operating mode, pulsed operating mode or ramp operating mode. In the resonator 70, the laser medium, or laser gas, is in this case heated to a temperature of approximately 260° C. Since the laser gas is circulated and only a portion of the gas quantity is present in the resonator 70 at a given time, the quantity of laser gas that is not in the resonator 70 can be cooled. This is achieved as the gas is passed over the cooling system 30, which is in direct contact with the heated laser gas and through which the cooling medium flows. The cooling medium absorbs the thermal energy of the laser gas, the laser gas being cooled down to approximately 20° C., in one step, as it flows past, and the cooling medium becoming heated, ideally, to up to 260° C.

The heated cooling medium is then conveyed away from the cooling system 30 via a fluid conveyor system, and is transferred to the energy recovery system 20 via the heat output side 31. In the energy recovery system 20, this thermal energy is used to operate the Stirling engine 25. The circulating coolant serves as a permanent heat source for the Stirling engine. The Stirling engine converts the thermal energy into mechanical energy, or into a rotary motion at a shaft. This shaft operates the air compressor 40 through direct drive or via a transmission. The air compressed by the compressor 40 is separated into its constituents $N_2$, $O_2$ and $CO_2$ by means of the filter system 50, the individual gases being routed into pressure storage devices (60.1 to 60.3), which are separate from one another. The control unit 15 decides whether gases are to be conveyed, via the recirculation system 80, to the resonator 70 or to the machining point of the focused laser beam, and which gas is to be conveyed. The control unit 15 also obtains information on how much gas has been consumed in the resonator and how much has to be replenished, as well as information on whether the laser is being used for flame cutting or fusion cutting. On the basis of this information, the control unit 15 makes a decision concerning, for example, the quantity to be supplied, the type of gas and the location to be supplied. A laser machining system is thereby provided in which the thermal waste heat has been utilized to generate a process gas that could be fed back to the laser machining system.

Figure 2:
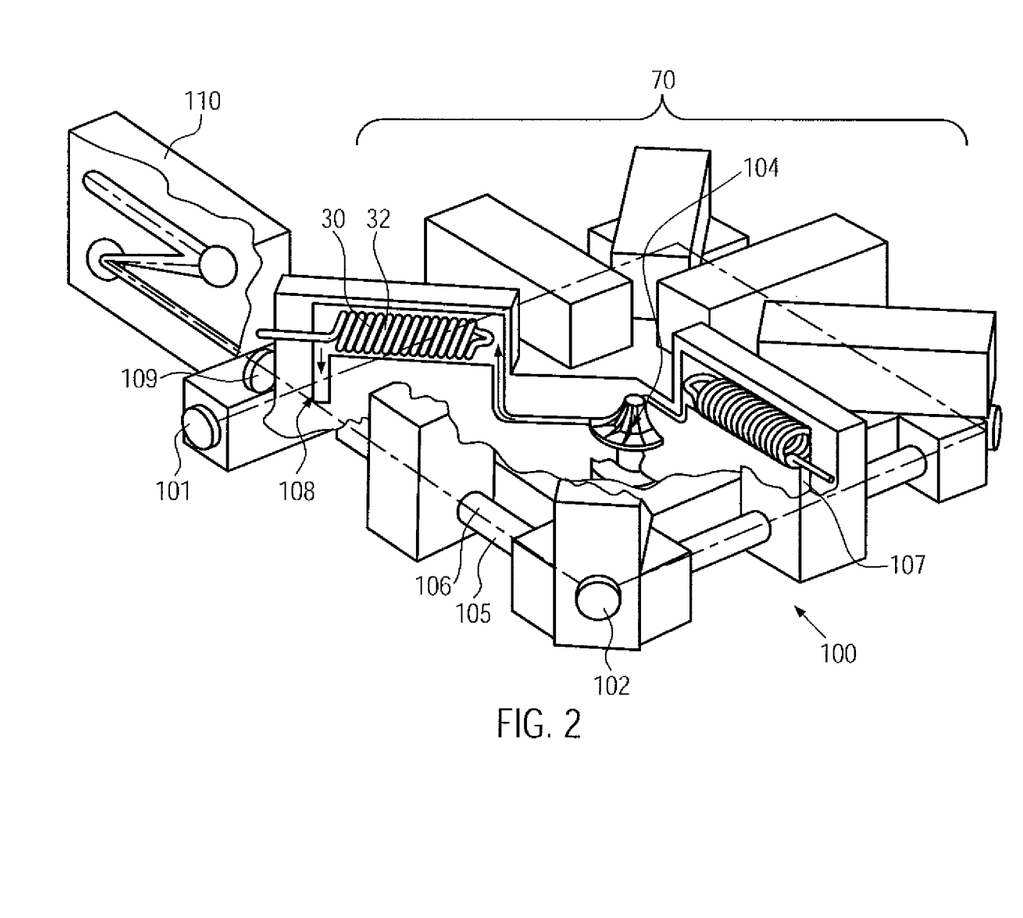
FIG. 2 is an opened oblique view of an exemplary $CO_2$ laser resonator.

FIG. 2 is an opened oblique view of the structure of an exemplary CO2 laser 100, which comprises a rear mirror 101, a plurality of redirecting mirrors 102, an output coupler mirror 109, a turboblower 104, a discharge tube 105 filled with laser gas, electrodes 106, a take-off housing 107, an infeed housing 108, a gas cooling means 30 and 32 and a beam telescope 110.

In the standard manner, the rear mirror 101, the redirecting mirror 102, the output coupler mirror 109, the discharge tube 105 filled with laser gas, and the electrodes 106 constitute a laser resonator 70. The discharge tubes 105 are quartz glass tubes, in which there is a laser gas. Located on the outside of the tubes 105 are the electrodes 106, which inject the excitation energy into the laser gas in a non-contacting manner.

Furthermore, it can be seen that the discharge paths are folded, and have a square structure. The redirecting mirrors 102 reflect the laser beam at the corners of the square, and optically connect the discharge paths. The rear mirror 101 and the output coupler mirror 109 complete the resonator.

The radial turboblower 104 is located in the center of the beam source. This turboblower continuously circulates the laser gas, which, at the corners of the square, at the infeed housing 108, flows into the discharge tubes and is returned again in the center of each side, through 107. In the infeed housing 108 and take-off housing 107 the gas flows around the water-cooled cooling system 30, or its cooling coils, or cooling fins, 32.

The laser gas becomes heated by the injection of the high frequency, or by the laser emission in the discharge tubes 105. The cooling system 30 shown cools the laser gas in two steps. The laser gas is cooled once in the take-off housing 107 and then, after passing the radial turboblower 104, is cooled again in the infeed housing 108. As a result, two separate cooling circuits are produced, at which the thermal energy can be tapped.

Figure 3:
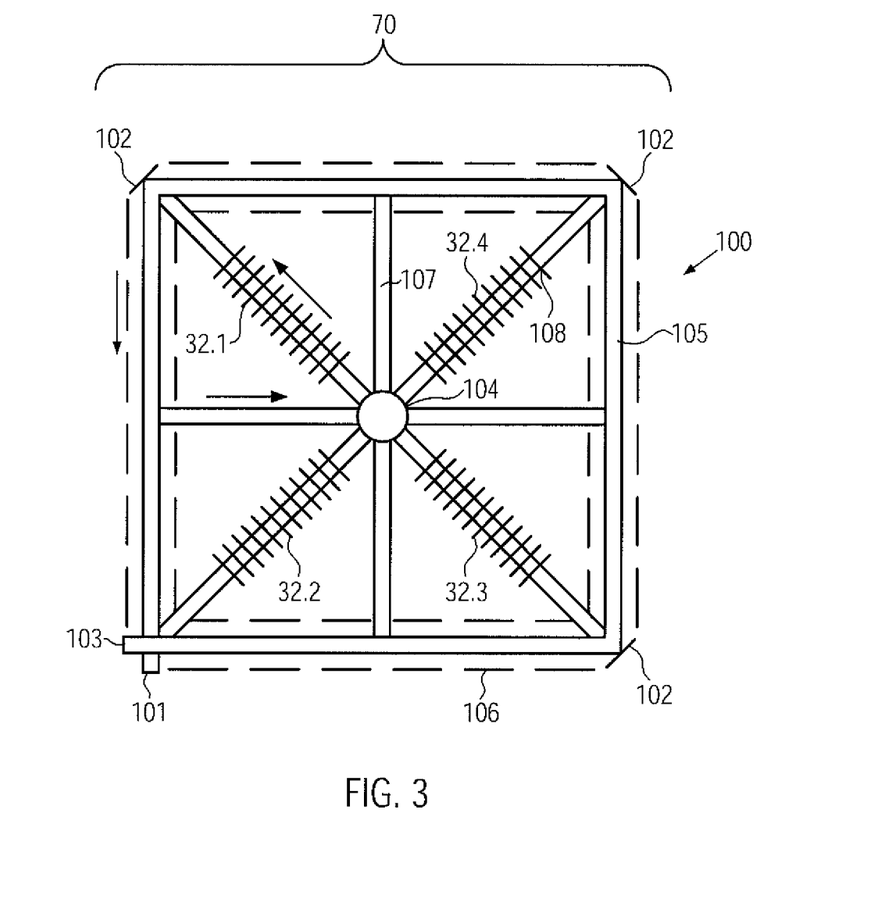
FIG. 3 is a schematic representation of an exemplary $CO_2$ laser resonator.

FIG. 3 is a schematic representation of an exemplary $CO_2$ laser resonator, by means of which it is possible to tap a large temperature range. The $CO_2$ laser comprises a rear mirror 101, a plurality of redirecting mirrors 102, an output coupler mirror 103, a turboblower 104, a discharge tube 105 filled with laser gas, electrodes 106, a take-off housing 107, an infeed housing 108, a cooling system 30 with cooling coils or cooling fins 32, and a beam telescope 110 (not shown).

In the standard manner, the rear mirror 101, the redirecting mirror 102, the output coupler mirror 109, the discharge tube 105 filled with laser gas, and the electrodes 106 constitute the laser resonator 70. The discharge tubes 105 are quartz glass tubes in which there is a laser gas. Located on the outside of the tubes 105 are the electrodes 106 which inject the excitation energy into the laser gas in a non-contacting manner.

The water-cooled cooling system comprises four cooling coils 31.1, 31.2, 31.3 and 31.4 in the infeed housing 108. Via these four cooling coils 31.1 to 31.4, thermal energy is extracted in parallel and can thus be supplied to the energy recovery system 20 (not shown).

The laser gas is heated to up to 200° C. as a result of the laser emission in the discharge tubes 105, and it is then heated to up to 260° C. in the radial turboblower as a result of compression and friction. The four cooling coils 31.1 to 31.4 cool the laser gas in one step, by the counterflow principle. The laser gas passes the take-off housing 107 and the radial turboblower 104, and is cooled only in the infeed housing 108. As a result, the cooling medium becomes heated to up to 260° C., and the result is a cooling circuit having a single, large temperature range and consequently a large ΔT at a single site at which thermal energy can be tapped. The heated cooling medium can then operate any given heat engine, or energy conversion engine, since a large temperature range, with a high $T_{max}$ of up to 260° C., is achieved.

Figure 4:
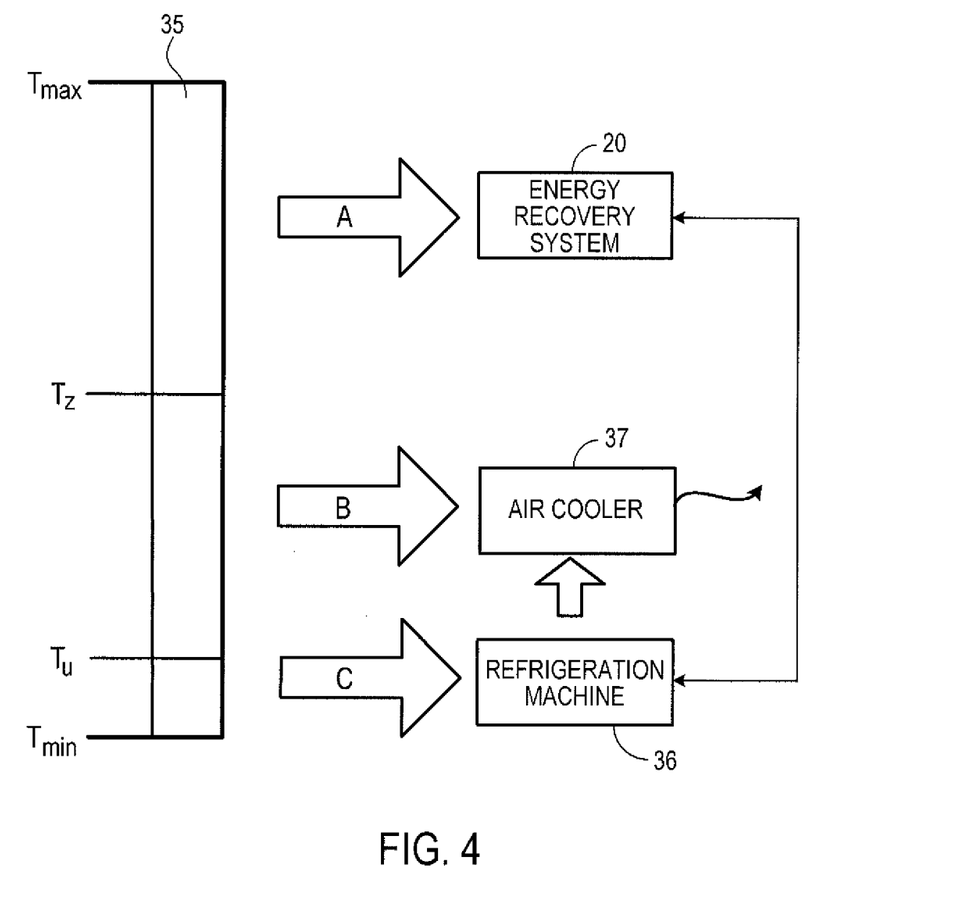
FIG. 4 is a schematic representation of an exemplary coolant circuit.

FIG. 4 is a schematic representation of an exemplary coolant circuit. The temperature characteristic of a coolant 35 is plotted schematically here. In this case, the higher the indication on the bar 35, the higher is the temperature of the cooling medium 35. The four most significant temperature levels are denoted again separately, namely, the maximum temperature $T_{max}$ of the cooling medium and the minimum temperature $T_{min}$. The maximum temperature $T_{max}$ occurs, for example, at a site of high waste heat, for example at the resonator. The minimum temperature $T_{min}$ is, for example, the input temperature of cooling medium at the site that requires the most extreme cooling. The maximum temperature $T_{max}$ can be 260° C., and the minimum temperature $T_{min}$ can be 25° C. Marked off close to the latter is the ambient temperature $T_u$, which can be approximately 50° C., and the threshold temperature $T_z$ of the energy recovery system 30 used is represented, which threshold temperature always lies between the ambient temperature $T_u$ and the maximum temperature $T_{max}$. Three ranges are thereby defined in the temperature characteristic of the cooling medium 35, being the range below the ambient temperature $T_u$, the range between the ambient temperature $T_u$ and the threshold temperature $T_z$, and the range above the threshold temperature $T_z$, up to the maximum temperature $T_{max}$.

These three temperature ranges are now treated differently in the cooling, or extraction, of the thermal waste heat. The upper range of the high-temperature heat, i.e., the range between the threshold temperature $T_z$ and the maximum temperature $T_{max}$, can be supplied, as per the block arrow A, to the energy recovery system 20 and utilized there. This range can therefore be used, for example by means of a sorption machine, to generate cold. The middle range is drawn off to the environment as waste heat, as per the block arrow B, via an air cooler 37. The lower region can only be cooled in that energy is again expended and, for example by means of a compression refrigeration machine 36, the thermal waste heat is drawn out of this range and raised to a higher temperature level (greater than $T_u$). From this higher temperature level, the waste heat can then be taken off to the environment. In some implementations, however, this additionally required energy for the final stage can be drawn, for example, from the energy recovery system 20 and supplied to the refrigeration machine 36, as indicated by the arrow between the energy recovery system 20 and the refrigeration machine 36. In the case of a sorption refrigeration machine as the energy recovery system 20, the arrow going out from the energy recovery system 20 represents the cold fed back into the laser machining system. This cold then serves directly to cool the temperature range between $T_{min}$ and $T_u$. As a result, less refrigerating capacity is required of the compression refrigeration machine 36. Consequently, its energy requirement is reduced. Ideally, the sorption refrigeration machine even covers the entire cold demand, and the compression refrigeration machine 36 can thus even be omitted entirely. The recovered energy from the energy recovery system 20 is thus returned to the laser machining system.

A number of embodiments have been described. Nevertheless, it will be understood that various modifications may be made without departing from the spirit and scope of the invention. Accordingly, other embodiments are within the scope of the following claims.

What is claimed is:

1. A method for the recovery of energy from a laser machining system, the method comprising:
   operating the laser machining system to generate thermal energy in a laser medium;
   transferring the laser medium from a laser resonator of the laser machining system to a cooling system, and from the cooling system to the laser resonator;
   using the cooling system to remove from the laser medium, at least a portion of the thermal energy from the laser medium above a characteristic threshold temperature Tz of an energy recovery system, and wherein using the cooling system comprises flowing a liquid cooling medium or a gas cooling medium through a plurality of cooling coils or a plurality of cooling fins of the cooling system to transfer the thermal energy from the laser medium to the liquid or gas cooling medium;
   transferring the liquid or gas cooling medium from the cooling system to the energy recovery system;
   using the energy recovery system to remove at least a portion of thermal energy from the liquid or gas cooling medium and to convert a first portion of the removed thermal energy into a second different form of energy;
   storing at least a portion of the second form of energy in an energy storage device;
   recirculating at least a portion of the stored energy to the laser machining system; and
   using a second portion of the removed thermal energy from the liquid or gas cooling medium to operate a refrigeration machine that further cools the liquid or gas cooling medium, wherein operating the refrigeration machine comprises drawing off thermal energy from the liquid or gas cooling medium below an ambient temperature Tu about the laser machining system and above a minimum temperature Tmin.

2. The method according to claim 1, further comprising using a plurality of energy recovery systems to convert the first portion of the removed thermal energy into a second form of energy.

3. The method according to claim 1, wherein removing at least the portion of thermal energy comprises removing at least the portion of thermal energy in multiple intervals between a threshold temperature Tz of at least one energy recovery system and a maximum temperature Tmax of the liquid or gas cooling medium.

4. The method according to claim 1, wherein operating the refrigeration machine further cools the liquid or gas cooling medium.

5. A method according to claim 1, wherein using the energy recovery system to remove at least a portion of thermal energy from the liquid or gas cooling medium comprises drawing off thermal energy below a threshold temperature Tz of the energy recovery system using an air cooler, wherein Tz is higher than Tu.

6. A method according to claim 5, wherein a maximum temperature Tmax of the liquid or gas cooling medium is less than or equal to 260° C., Tz is in the range from 60° C. to 120° C., Tu is in the range from 25° C. to 55° C., and Tmin is in the range from 20° C. to 35° C.

7. A method according to claim 1, wherein removing at least the portion of the thermal energy from the liquid or gas cooling medium occurs at the heat output side of the cooling system of the laser machining system.

8. A method according to claim 1, wherein using the energy recovery system to convert the first portion of the removed thermal energy into a second form of energy comprises converting the removed thermal energy into mechanical energy and using the mechanical energy to operate an air compressor, and wherein the second form of energy is compressed air.

9. A method according to claim 8, wherein storing at least a portion of the second form of energy comprises providing the compressed air compressed to a filtration stage to separate the air into air constituents.

10. A method according to claim 9, wherein the filtration stage comprises a membrane filter system or a pressure-swing adsorption system.

11. A method according to claim 9, wherein recirculating at least a portion of the stored energy comprises using at least one of the air constituents as the laser gas or the cutting gas.

12. A method according claim 9, wherein storing at least a portion of the second form of energy further comprises routing at least one of the air constituents into at least one pressure storage device.

13. A method according to claim 1, wherein removing at least the portion of the thermal energy from the liquid or gas cooling medium comprises removing thermal energy at at least two predefined temperature levels.

14. A device for the recovery of energy from a laser machining system having an energy source including a laser resonator, the device comprising:
- a cooling system configured to receive a laser medium from the laser resonator, transfer the laser medium to the laser resonator, and remove at least a portion of thermal energy from the laser medium, wherein the cooling system comprises a plurality of cooling coils or a plurality of cooling fins configured to flow therein a liquid cooling medium or a gas cooling medium for removing at least the portion of thermal energy from the laser medium;
- an energy recovery system configured to receive the liquid or gas cooling medium from the cooling system, to remove at least a portion of thermal energy from the liquid or gas cooling medium, and to convert a first portion of the thermal energy removed from the liquid or gas cooling medium into a second different form of energy;
- an energy storage device coupled to the energy recovery system, wherein the energy storage device is configured to store at least a portion of the second form of energy;
- a recirculation system to extract energy stored in the energy storage device and recirculate the extracted energy to the laser machining system; and
- a refrigeration machine configured to use a second portion of the thermal energy removed by the energy recovery system to further cool the liquid or gas cooling medium below an ambient temperature Tu about the laser machining system and above a minimum temperature Tmin.

15. The device according to claim 14, wherein the recirculation system comprises a pneumatic conductor or a hydraulic conductor.

16. The device according to claim 14, wherein the energy storage device comprises a pressure storage device.

17. The device according to claim 14, wherein the energy source further comprises at least one of a laser component, a HF generator, a dust arrester, a traversing motor, or a workpiece.

18. The device according to claim 14, wherein the energy recovery system comprises at least one of a steam engine, a sorption refrigeration machine, a thermoelectric generator, a steam turbine, a gas turbine, a Schukey engine, a Stirling engine, or a compact steam turbine.

19. The device according to claim 14, further comprising an air compressor.

20. The device according to claim 14, further comprising a membrane filter system.

21. The device according to claim 14, further comprising an open-loop or a closed-loop control unit.

22. The device according to claim 14, wherein the energy recovery system comprises an air compressor and is operable to convert the thermal energy into mechanical energy for the air compressor.

23. The device according to claim 22, wherein the energy recovery system further comprises a membrane filter system coupled to the air compressor, and wherein the membrane filter system is operable to separate air provided by the air compressor into two or more different gasses.

24. The device according to claim 23, wherein the two or more different gases comprise $O_2$, $N_2$, or $CO_2$.

25. The device according to claim 23, wherein the membrane filter system is coupled to the energy storage device, and the energy storage device comprises a pressure storage device.

26. The device according to claim 25, wherein the recirculation system is operable to recirculate the extracted energy to the laser machining system in the form of a laser gas or a cutting gas from the pressure storage device.

* * * * *

UNITED STATES PATENT AND TRADEMARK OFFICE
CERTIFICATE OF CORRECTION

PATENT NO. : 10,158,207 B2
APPLICATION NO. : 12/880390
DATED : December 18, 2018
INVENTOR(S) : Eberhard Wahl, Karel Vincke and Matthias Himmelsbach It is certified that error appears in the above-identified patent and that said Letters Patent is hereby corrected as shown below:

In the Claims

<u>Column 14</u>
Line 64, in Claim 12, after "according" insert -- to --

Signed and Sealed this
Second Day of April, 2019

Andrei Iancu
*Director of the United States Patent and Trademark Office*